Feb. 5, 1929.

C. L. HOWARD 1,701,111

OPERATING DEVICE FOR CAR COUPLERS

Filed Aug. 1, 1927

Inventor

Charles L. Howard

Feb. 5, 1929.   1,701,111
C. L. HOWARD
OPERATING DEVICE FOR CAR COUPLERS
Filed Aug. 1, 1927   4 Sheets-Sheet 2

Inventor
Charles L. Howard

Feb. 5, 1929. 1,701,111
C. L. HOWARD
OPERATING DEVICE FOR CAR COUPLERS
Filed Aug. 1, 1927 4 Sheets-Sheet 3

Inventor
Charles L. Howard

Feb. 5, 1929.  
C. L. HOWARD  
1,701,111  
OPERATING DEVICE FOR CAR COUPLERS  
Filed Aug. 1, 1927   4 Sheets-Sheet 4
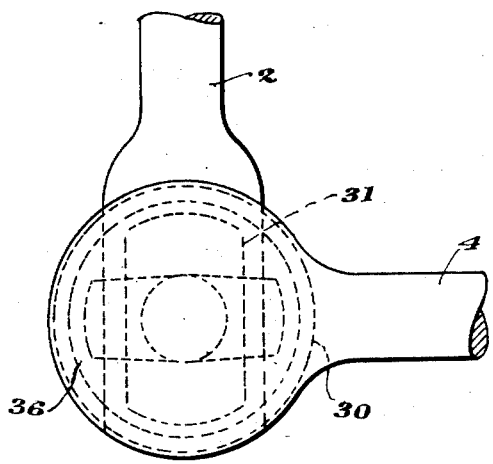
Fig.12
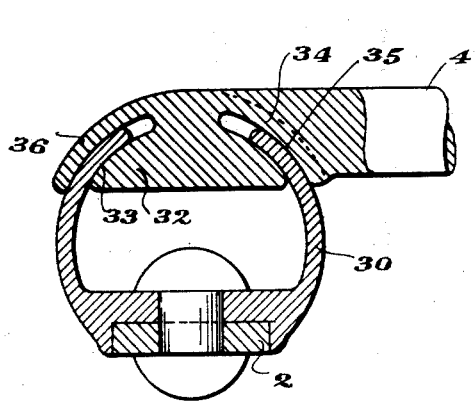 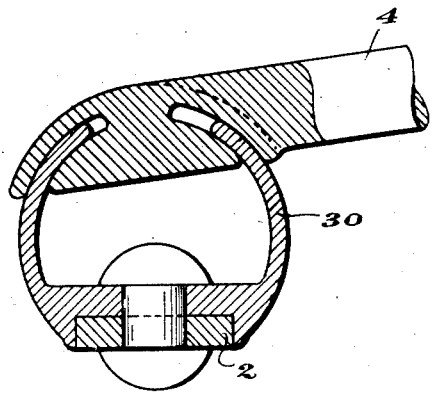
Fig.13   Fig.14
Inventor  
Charles L. Howard Patented Feb. 5, 1929.

1,701,111

UNITED STATES PATENT OFFICE.

CHARLES L. HOWARD, OF CHICAGO, ILLINOIS.

OPERATING DEVICE FOR CAR COUPLERS.

Application filed August 1, 1927. Serial No. 209,883.

This invention relates to mechanisms for operating railway car coupler locking pins and consists in an improvement in the connection between the operating member and pin lifting lever and has for its main object to provide a connection which permits the pin lifting lever to swing in a substantially horizontal plane but restricts the relative movement between the operating member and the pin lifting lever in a substantially vertical plane, and also to provide a hood to prevent ice, sand, cinders, or the like from interfering with the free operation of the connection.

Another object is to provide a connection wherein the operating member and the pin lifting lever may be easily assembled but which cannot be disconnected from each other when the device is assembled in operative position on the car.

Another object of the invention is to provide a connection in which removable securing means, such as bolts, nuts, cotter pins, etc., are not required to retain the component parts in proper relative position or which does not comprise loops which may be accidently or maliciously opened to the detriment of the device.

In the drawings:

Figs. 1, 2, 3 and 4 show several types of car coupler operating devices to which my invention is applicable.

Figs. 5, 6, 7, and 8 show one form of the invention.

Figs. 12, 13 and 14 show a modified form.

Figure 1:
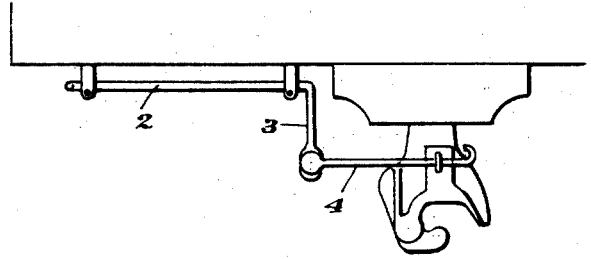

There are several forms of car coupler operating mechanisms to which my device is applicable; for instance, such types as shown in Figs. 1, 2, 3 and 4, respectively. Fig. 1 shows a device wherein the operating member 2 consists of a rotatable rod mounted on the car and having a depending handle at its outer end and a forwardly projecting crank 3 at its inner end. The pin lifting lever 4 loosely engages the coupler at its inner end and is connected to the operating member by my improved device.

Figure 2:
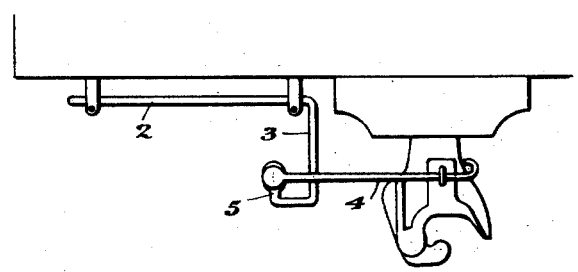

Fig. 2 shows a device wherein the operating member 2 consists of a rotatable rod mounted on the car having a depending handle at its outer end with a crank at its inner end with a return bend 5 at its inner end with the pin lifting lever 4 connected to the operating member by my improved device. The pin lifting lever also rests upon the crank 3 to provide additional support if deemed advisable.

Figure 3:
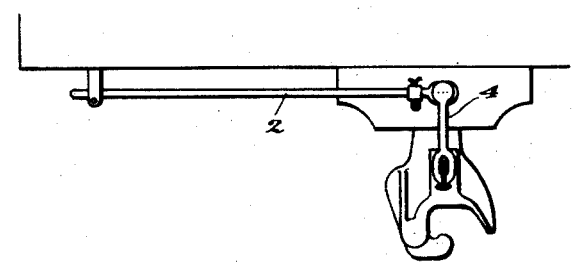

Fig. 3 shows a car coupler operating mechanism wherein the operating member 2 consists of a rotatable rod mounted on the car and having a depending handle at its outer end and the pin lifting lever 4 extending longitudinally of the car with one end operatively connected to the coupler and the other end connected to the operating member by my improved device.

Figure 4:
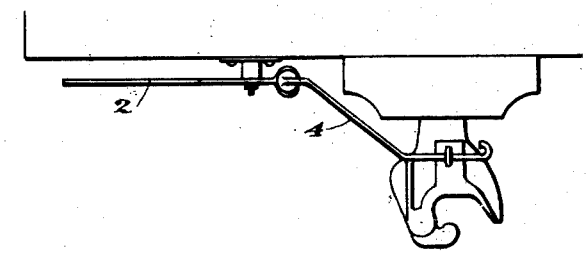

Fig. 4 shows a car coupler operating mechanism wherein the operating member 2 consists of a downwardly movable lever fulcrumed to the car with the pin lifting lever 4 connected to it by my improved device. My improved joint may be positioned at the fulcrum or the operating member may extend beyond the fulcrum and the pin lifting lever connected thereto at its end.

It is understood that the joint or connection which I hereafter describe is not only applicable to the four types of device heretofore described, but also is applicable to other types of car coupler operating mechanisms.

Figure 5:
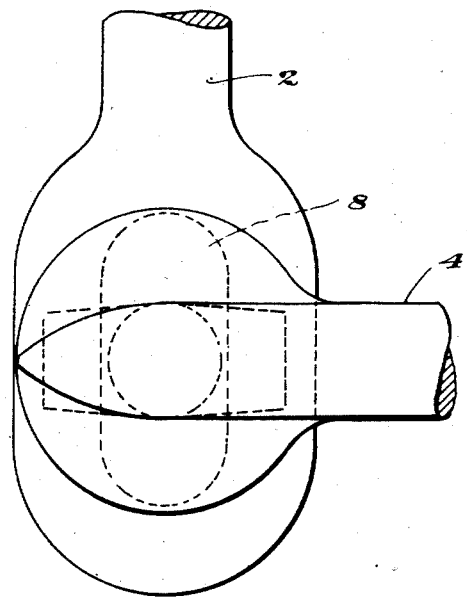
Figure 6:
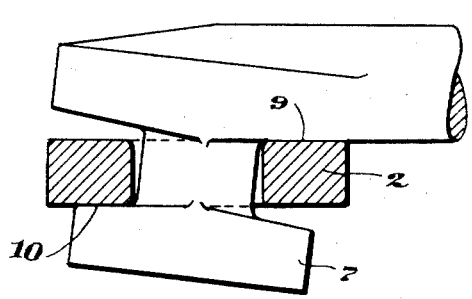
Figure 7:
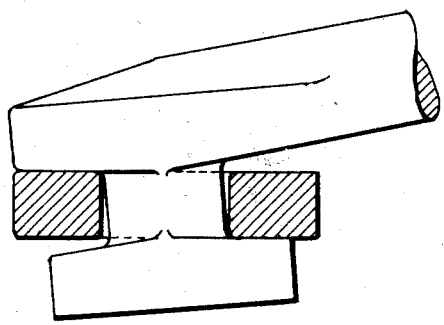
Figure 8:
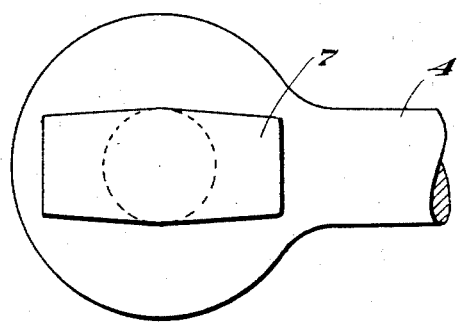

Figs. 5, 6, 7 and 8 show the joint or connection in detail; Fig. 5 showing a plan of the associated parts; Fig. 6 showing an elevation when the device is in normal position and Fig. 7 showing it when the coupler is in "lock set" position. Fig. 8 is a bottom view of the pin lifting lever and its T-head and hood.

To connect the ends of the operating member 2 and the pin lifting lever 4, the T-head 7 is placed in alignment with the slot 8 and inserted therethrough and the pin lifting lever with its T-head is given a right hand turn which makes the connection shown particularly in Fig. 5. The pin lifting lever is then connected to the coupler and the operating member is mounted on the car. When in operative position it will be seen that the pin lifting lever will be permitted to swing in a substantially horizontal plane but will be limited in its movement in a substantially vertical plane on account of the surface 9 of the hood and the surface 10 of the T-head 7 coming in contact with the underside of the operating member 2 adjacent the slot 8. The operating member and the pin lifting lever cannot be disconnected from each other while the coupler operating mechanism is mounted on the car. To disengage the lever from the operating member it is only necessary to swing the lever in a position to permit the T-head to be in alignment with the slot and then to withdraw the T-head.

Figures 9, 10:
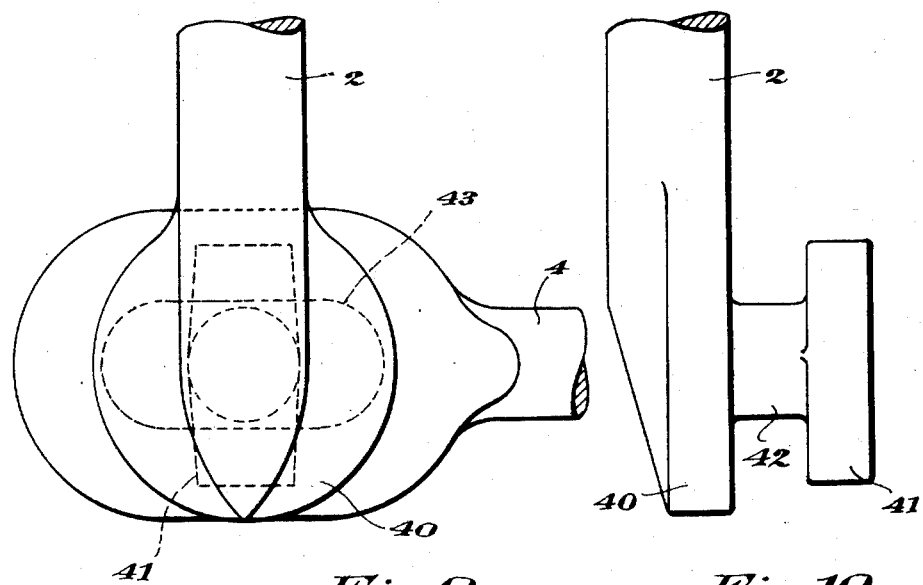
Figs. 9, 10 and 11 show a form with reversal of parts.
Figure 11:
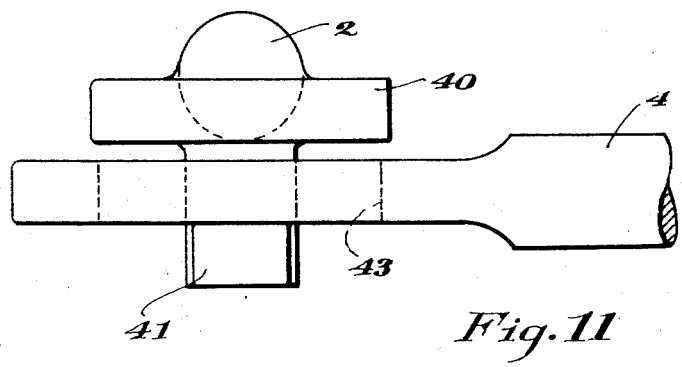

Figs. 9, 10 and 11 show a form with reversal of parts wherein the hood 40, T-head 41 and shank 42 are attached to the operating member 2, or formed integral therewith, and the elongated aperture 43 is formed in the pin lifting member 4.

Figs. 12, 13 and 14 show a modified form wherein the operating member 2 is provided with a semi-spherical housing 30, integral or otherwise, provided with a slot 31 through which the semi-spherical T-head 32 is inserted and positioned so as to engage the inner side thereof (at 33) and a portion 34 of the semi-spherical hood engages the outer side thereof (at 25). The hood also constitutes a stop 36 to prevent the pin lifting member from slipping too far through the slotted housing.

It will be noted that in all forms of my invention an extremely safe and simple construction may be made between the operating member and the pin lifting lever. It will be seen that it is impossible for these two parts to become disengaged while the uncoupling device is on the car and in making this connection such removable securing means as bolts, nuts, cotter pins, etc., are not necessary. And in using a connection in accordance with my invention it will be seen that sufficient horizontal movement of the pin lifting lever is provided for, while at the same time, a limited vertical movement only is permitted.

It is to be understood that the invention is not limited to the exact details of construction shown and described, as it is obvious that various modifications thereof within the scope of the claims will occur to persons skilled in the art.

I claim:

1. In an uncoupling device for car couplers, an operating member, a substantially horizontal pin lifting member having at one extremity means to support a coupler pin and having at its other extremity a T-head and slot connection with said operating member, said T-head engaging the underside of said operating member adjacent the slot, and a hood on the pin lifting member substantially covering the slot engaging the upper side of said operating member adjacent the slot, which hooded connection permits one member to swing in a substantially horizontal plane but restricts the relative movement between the members in a substantially vertical plane and tends to protect the connection from the weather.

2. In an uncoupling device for car couplers, an operating member, and a substantially horizontal pin lifting member having at one extremity means to support a coupler pin and having at its other extremity a T-head and slot connection with said operating member comprising a semi-spherical slotted housing with the T-head engaging the inside thereof, and a semi-spherical hood on the pin lifting member substantially covering the slot engaging the outer side thereof, which hooded connection permits one member to swing in a substantially horizontal plane but restricts the relative movement between the members in a substantially vertical plane and tends to protect the connection from the weather.

CHARLES L. HOWARD.